Oct. 28, 1924.
R. O. P. HUMPHERY ET AL
1,513,322
COLOR CINEMATOGRAPHY
Filed Oct. 5, 1922
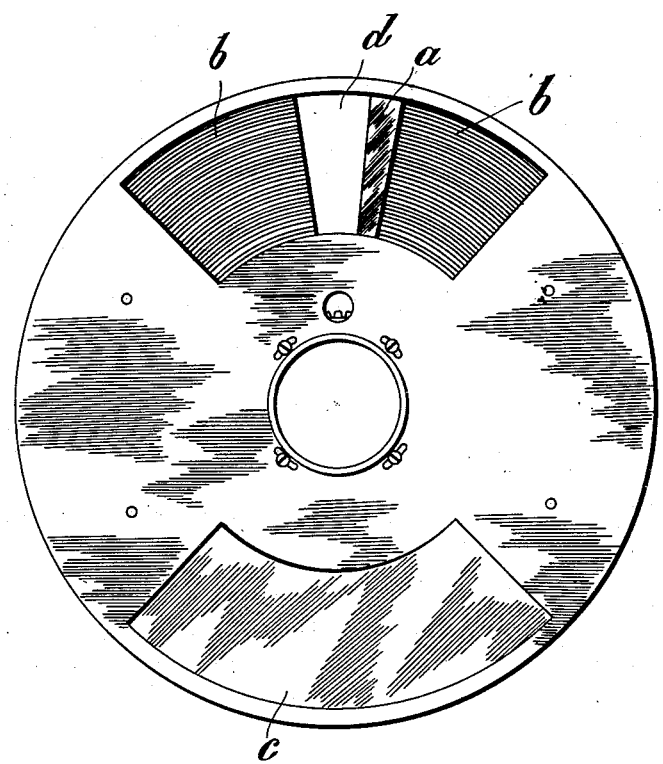
INVENTORS
Roland O. P. Humphery,
Claude H. Friese-Greene,
BY Bright + Bailey
ATTYS.

Patented Oct. 28, 1924.

1,513,322

UNITED STATES PATENT OFFICE.

ROLAND OLIPHANT PERCY HUMPHERY, OF LONDON BRIDGE, AND CLAUDE HARRISON FRIESE-GREENE, OF BROMLEY, ENGLAND.

COLOR CINEMATOGRAPHY.

Application filed October 5, 1922. Serial No. 592,564.

*To all whom it may concern:*

Be it known that we, ROLAND OLIPHANT PERCY HUMPHERY and CLAUDE HARRISON FRIESE-GREENE, both British subjects, residing at New Hibernia Chambers, London Bridge, S. E. 1, England, and 32 Crescent Road, Bromley, Kent, England, respectively, have invented new and useful Improvements in and Connected with Color Cinematography; and we do hereby declare the following to be a full, clear, and exact description of the invention, such as will enable others skilled in the art to which it appertains to make and use the same.

This invention relates to color cinematography in which different sections of the surface of a panchromatic or color sensitive film are exposed alternately to white light and to colored light which is essentially on the red side of the spectrum.

In color cinematography difficulty has heretofore been experienced in obtaining gradations of color and therefore natural colorings in the projected pictures.

The object of the present invention is to obtain gradations of color, especially in those colors on the blue side of the spectrum or in those colors in which such colors form a part whereby pictures are obtained approximating more perfectly in color to those of nature than has heretofore been possible.

This is effected according to the present invention by employing a moving shutter having a color phase which is on the blue side of the spectrum in association with an aperture passing white light and which color phase is of an area which is less than the area of the white light by which means a greater gradation of color is obtained.

The invention consists broadly in exposing alternately, different sections of the surface of a panchromatic or color sensitive film to white light with a color phase as above described which is on the blue side of the spectrum and to colored light which is essentially on the red side of the spectrum.

The color phase is intended to increase the color value on the blue side of the spectrum and in no case is an exposure to white light made in conjunction with light on the red side of the spectrum.

It has been proposed in recording color values to expose the same panchromatic emulsion to both colored and approximately white light by the employment of a rotating disc carrying color screens one or all of which is or are provided with an aperture to allow of the passage of white light. In this prior case however the area of the color screen in each instance exceeds that of the white light whilst in some cases white light is employed in conjunction with a color screen of a color which is on the red side of the spectrum.

In practice we utilize the usual disc containing two apertures which disc is rotated at half the speed of the shutter. One aperture we utilize to allow the passage of white light with a color phase, which phase is a color essentially on the blue side of the spectrum and which may suitably be of a blue-green shade. The other aperture is filled with a transparent filter colored for example a shade between a yellow and a red. The aperture allowing the passage of the white light with a color phase is preferably adjustable in area so as to obtain a balance with the color filter and such aperture may be subdivided into two or more apertures if desired which further apertures are preferably disposed on the opposite sides of the line passing through the axis of the disc and the middle of the aperture containing the color filter but as close as possible to each end of the aperture containing the color phase the only essential being that the total of the areas of the subdivided apertures should approximately equal the area of a single aperture when such only is employed.

By sub-dividing the aperture allowing the passage of white light with a color phase into two or more sections and by disposing two of such sections as close as possible to the ends of the aperture containing the color filter we find that we minimize displacement between the two pictures taken during each revolution of the disc and as a consequence color fringing in the projected positives is also minimized.

We find in practice that the best results are obtained by gradually diminishing the intensity of the colored filter from one end of the aperture to the other the exposure being made first through the densest end of the filter or through the lightest end.

The gradual varying of the density of the color filter is of great practical importance inasmuch as it operates to reduce the period of exposure which would otherwise be required were the light passed through a filter in which the required color was of a uniform density. In the form in which we prefer to use it, the color at the densest end is slightly denser than the color which would normally be required in a screen of constant density so that the first part of the exposure is made in one instance with light of a low intensity but of the required color, which light then gradually increases in intensity as the aperture is moved across the path of the light passing through the lens.

It will thus be seen that the essential feature of the present invention is the taking of one picture through a color filter adapted to exclude white light but to transmit light at the red end of the spectrum and the taking of the other or succeeding picture by exposing the particular surface of the panchromatic or color sensitive emulsion to white light with a color phase which is of less value than the white light so as to enable gradations of color to be obtained. The relative areas of the aperture containing the color filter and the aperture or apertures adapted to allow the passage of white light together with the density of color of the color filter may of course be varied to suit particular conditions as regards light and nature of subject being photographed, the essential desideratum being to obtain an approximately equal balance in the exposure of successive pictures.

For example in taking pictures in artificial light the color filter will preferably be tinted an approximate red as distinct from a shade between a yellow and a red as employed in natural light.

In practice the color phase may either be located in the white light aperture or the same may be positioned in a separate aperture which, in the case where two white light apertures are employed, may be located between such apertures. The relative area of the color phase may also be varied to suit requirements.

The positive pictures are colored in the usual manner, the picture taken through the color filter being tinted an approximately orange-red and the picture taken by exposure to white light with a color phase being tinted an approximately blue-green. It is essential however that the luminous value of the orange-red should balance the luminous value of the blue-green as by thus equalizing the luminous values of these colors the obviation of flicker in the projected pictures is assisted.

In order that the invention may be clearly understood one example of the same will now be described by aid of the accompanying drawing which shows a front elevation of a conventional filter shutter provided with filters according to this invention.

In the drawing $a$ represents a blue-green phase, $b$ a filling of opaque material and $c$ a color filter the color of which is on the red side of the spectrum. It is most essential that these filters should balance each other whereby the light passing through each shall affect the sensitized surface of the film equally. For this purpose the aperture or slit $d$ for white light must be an exact predetermined size which is dependent upon the density and area of the opposite or red filter and the density and area of the blue-green phase.

We have found that good results are obtainable by the use of a blue-green phase of small area and such an example is illustrated in the drawing.

The following is one complete application of the invention when using the arrangement illustrated in the drawing.

Area of white light aperture—.6233 sq. inch.

Area of blue-green filter—.255 sq. inch.

The blue-green filter $a$ is colored with the following solution:—

Solution A—rapid green which is a sodium salt of tetramethyldibenzyltriaminotriphenylcarbinol disulphonic acid anhydride:—10 grams; distilled water:—10 ounces.

Solution B—patent blue which also is a triphenylmethane dye, and is a disulfonic acid derivative of oxytetraethyldiaminotriphenylmethane:—10 grams; distilled water:—20 ounces.

These solutions are mixed as follows:—

1¼ ounces of solution A and 1¾ ounces of solution B. To this mixture is added four ounces of distilled water.

The transparent filter material, preferably having a gelatine base, is immersed in the above solution for one minute, after which it is rinsed in distilled water for fifteen seconds and then allowed to dry.

Filter $c$ is colored by immersion in the following solution:— Flavazine T which is one of the few important dyes belonging to the small class of pyrazolone dyestuffs, and is similar to tartrazin:—10 grams; distilled water:—10 ounces.

The flavazine T is dissolved in the distilled water. The solution is applied to the filter material by means of a brush so as to obtain the gradual effect previously referred to in this specification.

The density and area of the color filter $c$ is determined by test so as to balance with the aperture for white light and the blue-green color phase.

The positive film is colored by direct application of blue-green and orange-red coloring alternately, the blue-green being applied to the portion of the film corresponding to that portion of the negative which has been exposed to light passing through the white aperture and the blue-green and the orange-red to the portion of the film corresponding to that portion of the negative which has been exposed to light passing through the flavazine filter. One suitable solution for coloring the blue-green picture is as follows:—

Solution A:—rapid green which is a sodium salt of tetramethyldibenzyltriaminotriphenylcarbinol disulphonic acid anhydride:—10 grams; distilled water:—10 ozs.

Solution B:—patent blue:—10 grams; distilled water:—20 ozs.

To a mixture of one ounce of solution A and two ounces of solution B add two ounces of distilled water.

The solution for coloring the orange-red picture is as follows:—

Solution A:—fast red D which is a naphthionic acid+B naphthol disulpho acid R, a bluish red:—10 grams; distilled water:—11 ozs.

Solution B:—flavazine T:—10 grams; distilled water:—10 ozs.

To a mixture of three ounces of solution A and one half ounce of solution B add three ounces of distilled water.

The increased speed of exposure obtainable by means of this invention permits pictures to be taken in less than brilliant sunlight and in normal artificial light. This feature also permits the positive pictures to be projected at a speed more nearly approximating to the speed at which black and white pictures are projected by reason of the fact that the correct exposures obtainable produce more perfect blending of the colors in the projected pictures without requiring, as hitherto, a greater projection speed for this purpose. It is desirable in practice to speed up the intermittent motion of the camera so as to lessen the time taken in moving portions of the film successively into position for exposure. By thus quickening up the motion of the film it is possible to use filters of larger area, thus increasing still further the speed of exposure and reducing color fringing, in the projected pictures, to a minimum.

What we claim is:—

1. In color cinematography apparatus, a shutter having an opening therein, a color filter on the blue side of the spectrum intermediate the ends of said opening, opaque material completely closing the space between one side of said color filter and an adjacent end of said opening, opaque material extending from the other end of said opening to a point in spaced relation to said color filter, a second opening in said shutter opposite to said first mentioned opening, and a color filter on the red side of the spectrum completely closing said second opening.

2. In color cinematography apparatus, a shutter having an opening therein covered by a color filter having diminishing density from one end to the other thereof in combination with an aperture passing white light and a color phase on the blue side of the spectrum.

3. The method of taking pictures which consists in alternately exposing different sections of the surface of a color sensitive film to a white light with a color phase on the blue side of the spectrum which is of less value than the white light, and to a colored light essentially on the red side of the spectrum which excludes white light.

In witness whereof we have signed this specification in the presence of two witnesses.

ROLAND OLIPHANT PERCY HUMPHERY.
CLAUDE HARRISON FRIESE-GREENE.

Witnesses:
GEORGE HUGES,
ALBERT S. MICKLIN.